United States Patent
Ingels (10) Patent No.: US 8,683,101 B2
(45) Date of Patent: Mar. 25, 2014

(54) SINGLE WIRE BUS COMMUNICATION PROTOCOL

(75) Inventor: Didier Ingels, Grand-Rosiere (BE)

(73) Assignee: Proton World International N.V., Zaventem (BE)

( * ) Notice: Subject to any disclaimer, the term of this patent is extended or adjusted under 35 U.S.C. 154(b) by 265 days.

(21) Appl. No.: 12/840,652

(22) Filed: Jul. 21, 2010

(65) Prior Publication Data

US 2011/0022753 A1  Jan. 27, 2011

(30) Foreign Application Priority Data

Jul. 22, 2009 (FR) ...................................... 09 55109

(51) Int. Cl.
*G06F 3/00* (2006.01)
*G06F 13/42* (2006.01)

(52) U.S. Cl.
USPC .............................. 710/105; 710/30; 710/106

(58) Field of Classification Search
USPC ........ 710/11, 14, 30, 105–106, 305; 713/375, 713/400, 500, 503, 600; 375/272, 275, 375/302–303, 322, 334–337, 274
See application file for complete search history.

(56) References Cited

U.S. PATENT DOCUMENTS

| | | | |
|---|---|---|---|
| 2,548,345 A | 4/1951 | Butts | |
| 3,885,098 A * | 5/1975 | Dowling | 375/328 |
| 4,663,499 A | 5/1987 | Duval | |
| 5,495,240 A * | 2/1996 | Heberle | 340/870.13 |
| 5,864,872 A * | 1/1999 | Lee et al. | 711/115 |
| 6,298,066 B1 * | 10/2001 | Wettroth et al. | 370/449 |
| 7,143,215 B2 * | 11/2006 | Dunstan et al. | 710/104 |
| 7,406,100 B2 * | 7/2008 | Rocas et al. | 370/503 |
| 7,539,803 B2 * | 5/2009 | Fischer et al. | 710/106 |
| 7,606,955 B1 * | 10/2009 | Falik et al. | 710/110 |
| 7,778,185 B2 * | 8/2010 | Kollner et al. | 370/241 |
| 2001/0030617 A1 * | 10/2001 | Cusey | 341/119 |
| 2003/0219004 A1 * | 11/2003 | Liu et al. | 370/350 |
| 2004/0208200 A1 * | 10/2004 | Hejdeman et al. | 370/476 |

OTHER PUBLICATIONS

"Smart Cards; UICC—Contactless Front-end (CLF) Interface; Part 1: Physical and data link layer characteristics (Release 7)". Technical Specification ETSI TS 102 613. Version 7.3.0. 2008. European Telecommuncations Standards Group.*
Oliver, D. John. Implementing the J1850 Protocol. Nov. 18, 1996. pp. 1-15.*
"AU5790 Single wire CAN transceiver". Application Note AN2005. Apr. 16, 2001. Philips Semiconductors. pp. 1-24.*
French Search Report dated May 31, 2010 from corresponding French Application No. 09/55109.

* cited by examiner

*Primary Examiner* — Thomas J Cleary
(74) *Attorney, Agent, or Firm* — Wolf, Greenfield & Sacks, P.C.

(57) ABSTRACT

A method of communication over a single-wire bus between a transmitter device and at least one receiver device, wherein each data bit is transmitted in a frame successively including: a synchronization slot different from a reference voltage of the devices; a first idle slot in a state corresponding to the reference voltage of the circuit; a slot representing the data bit to be transmitted; a second idle slot identical to the first one; a slot intended to contain the state of an optional response bit; and an end slot identical to the idle slot.

24 Claims, 4 Drawing Sheets

SINGLE WIRE BUS COMMUNICATION PROTOCOL

CROSS REFERENCE TO RELATED APPLICATIONS

This application claims the priority benefit of French patent application Ser. No. 09/55109, filed on Jul. 22, 2009, entitled "SINGLE-WIRE BUS COMMUNICATION PROTOCOL," which is hereby incorporated by reference to the maximum extent allowable by law.

BACKGROUND OF THE INVENTION

1. Field of the Invention

The present invention generally relates to electronic circuits and, more specifically, to communication protocols over a single-wire link. The present invention also relates to such protocols capable of operating in bidirectional fashion.

2. Discussion of the Related Art

There exist many communication protocols over a single-wire bus between two electronic circuits. Reference is often made to so-called SWP (Single-Wire Protocol) or 12C protocols, which are standardized protocols. Such protocols actually exploit two transmission lines, one for a clock signal and the other for a data signal.

A problem of single-wire buses is that the loads (the transmit and receive circuits) which are connected thereto generate coupling variations. Further, single-wire buses are often sensitive to noise since the communication frames have no reference levels.

SUMMARY OF THE INVENTION

It would be desirable to have a single-wire bus communication protocol which overcomes all or part of the disadvantages of usual protocols.

An object of an embodiment of the present invention is to provide a communication protocol over a single-wire bus both conveying the synchronization and data signals.

An object of an embodiment of the present invention is to provide a bidirectional protocol.

An object of an embodiment of the present invention is to provide a multipoint system in which a same master circuit can send data to several slave circuits.

To achieve all or part of these objects as well as others, at least one embodiment of the present invention provides a method of communication over a single-wire bus between a transmitter device and at least one receiver device, wherein each data bit is transmitted in a frame successively comprising:

a synchronization slot different from a reference voltage of the devices;

a first idle slot in a state corresponding to the reference voltage of the circuit;

a slot representing the data bit to be transmitted;

a second idle slot identical to the first one;

a slot intended to contain the state of an optional response bit; and an end slot identical to the idle slots.

According to an embodiment of the present invention, the durations of all the slots of the frame are identical.

According to an embodiment of the present invention, the synchronization slot is coded differently from the high level of the data bits.

According to an embodiment of the present invention, the reference voltage is identical to the low level of the data bits.

According to an embodiment of the present invention, to transmit data from the receiver to the transmitter, the receiver codes the slot intended for the response bit.

According to an embodiment of the present invention, the bus is, in the idle state, set to the reference voltage.

At least one embodiment of the present invention also provides a transceiver unit comprising:

a control unit;

an element for serializing data to be transmitted;

an element for parallelizing received data;

an encoder of the data to be transmitted, receiving the output of the serialization element and having its output connected to the single-wire bus; and a decoder having its input connected to the single-wire bus and having its output connected to the input of the parallelizing circuit.

According to an embodiment of the present invention, the unit comprises a unit for configuring the transmission speed.

According to an embodiment of the present invention, the circuit comprises an input for configuring the master or slave status of the concerned circuit.

According to an embodiment of the present invention, the circuit comprises an input for configuring the mode in which the transmissions are coded and decoded among several modes.

The foregoing objects, features, and advantages of the present invention will be discussed in detail in the following non-limiting description of specific embodiments in connection with the accompanying drawings.

DETAILED DESCRIPTION

The same elements have been designated with the same reference numerals in the different drawings.

For clarity, only those elements useful to the understanding of the present invention have been shown and will be described. In particular, the nature of the data to be transmitted has not been detailed, the present invention being compatible with any usual digital data. Further, the destination of the transmitted data has not been detailed either, the present invention being here again compatible with any usually exploited data.

Figure 1:
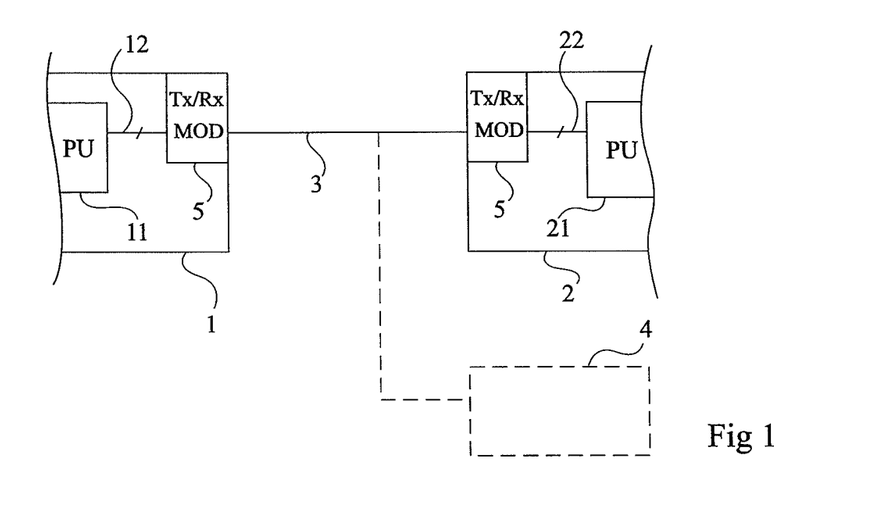
FIG. 1 is a partial block diagram of a communication system of the type to which the present invention applies as an example.

FIG. 1 is a partial block diagram of a system of communication between two circuits 1 and 2 via a single-wire bus or link 3. Each circuit 1, 2 comprises one or several units 11, 21 (PU) for processing the data to be transmitted and received. Each unit 11 or 21 communicates with a transceiver unit 5

(Tx/Rx MOD), having the function of converting data to be transmitted present on a bus 12, respectively 22, to have them transit over single-wire link 3 towards the other circuit, and of decoding a signal received over single-wire bus 3 into receive data to be transmitted to the corresponding processing unit. Other circuits (memories, sensors, various processing circuits according to the application, etc.) may equip circuits 1 and 2.

For a given communication, one of circuits 1 or 2 operates as a master and the other one operates as a slave. The master circuit controls the rate of the communication to the slave circuit.

Other circuits 4 (in dotted lines in FIG. 1) may be connected to single-wire link 3 for an application to a multipoint communication structure. In this case, one circuit behaves as a master and all other circuits operate as slaves. Most often, the beginning of a communication comprises an address of the circuit to which this communication is addressed, which enables, in a bidirectional mode, this sole circuit to respond to the master circuit.

For an operation in a system where several circuits are capable of taking control of the bus to start a transmission towards one or several other circuits, that is, where several circuits are capable of being masters, the single-wire bus is idle at ground. In the idle state, all the connected circuits pull (weakly) the bus to ground, only so that the bus level is not floating. Before grabbing the line to start a communication, a circuit connected to the bus desiring to transmit data starts by making sure that the bus is at the low level for a sufficient time period. A sufficient time period means, as will be better understood hereafter, a time period enabling to make sure that no communication is already going on over the bus. If the bus is free, the circuit desiring to take control of it pulls the bus to a different level, typically a level close to its supply voltage, for example, by means of a resistor (pull-up). The other circuits connected to the bus are then placed in slave mode.

In a simplified embodiment where a single circuit is capable of behaving as a master, such precautions are not necessary.

Figures 2, 3:
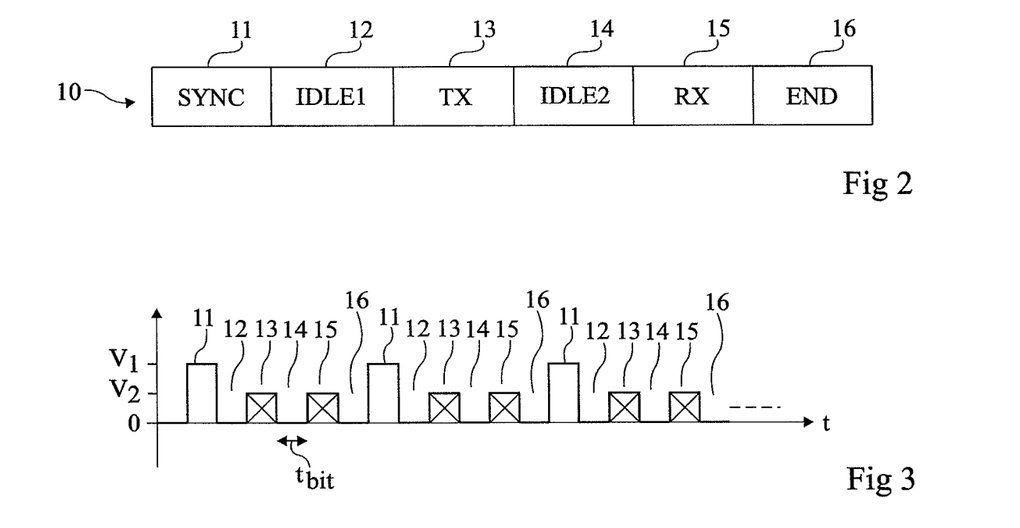
FIG. 2 illustrates a frame of the protocol according to an embodiment of the present invention.
FIG. 3 is a timing diagram of an embodiment of the present invention.

FIG. 2 shows an embodiment of a transmission frame between a master circuit and one or several slave circuits. Frame 10 comprises six time slots. All the slots of a same frame have the same duration. Further, the different slots of frame 10 respect predefined states.

Each frame 10 successively comprises:
a synchronization slot 11 (SYNC);
an idle slot 12 (IDLE 1);
a slot 13 representing the state (Tx) of a bit transmitted in the frame in the transmitter-to-receiver or master-to-slave direction;
a second idle slot 14 (IDLE 2);
a slot 15 representing the state of a bit transmitted from the receiver to the transmitter (RX); and
an end slot 16 (END) or another idle slot.

Synchronization slots 11 are represented by a state considered as high, selected to be different from the two states (for example, 0 and 1) representative of a data bit. Slot 11 enables each receiver to synchronize its receive circuit. The beginning of the synchronization occurs on the rising edge of slot 11 and the end of the synchronization occurs on its falling edge. The time interval (duration of the synchronization slot) is used as a time base for the entire frame.

Idle slots 12 and 14, as well as slot 16, are represented by a low state. This state is, for example, identical to one (for example, 0) of the two states representative of a data bit. The presence of slots 12 and 14 between the data slots enables to absorb possible disturbances and to prepare the actual transmissions and receptions.

The slots containing the bits transmitted by transmitter TX (called transmit bits) or by receiver RX (called receive bits) take a high or low state according to the value 1 or 0 (or conversely) to be transmitted. The high state of the transmitted bits is coded differently from the high state of the synchronization slot. In a specific embodiment, a receive bit in the high state corresponds to an acknowledgement of receipt for the transmit bit.

FIG. 3 is a timing diagram illustrating a first embodiment of frame 10 of FIG. 2. In this example, a voltage modulation is considered. The low states are coded by a low voltage level, preferably the reference potential of the power supply voltage of the circuits (typically the ground). The high states are coded by two different voltage levels V1 and V2 (V1 being arbitrarily greater than V2), one for the synchronization slot, the other for a data bit. The circuits connected to the bus have a common reference voltage (ground) but may have different high power supply voltages, provided that they have levels V1 and V2. To simplify the following description, the system circuits are assumed to be powered independently from the bus and with the same voltage level. The low or high state of slots 13 and 15 has been illustrated by a cross to enhance the fact that the slot takes level 0 or V2 according to the state of the bit to be transmitted.

As illustrated in FIG. 3, the data bits to be transmitted are transmitted in successive frames. The interval between two frames is preferably null, that is, a synchronization slot 11 of a frame follows the end slot 16 of the previous frame. As a variation, a time shift may be provided. In particular, such a shift is generally present between the end of a transmission and the beginning of the next one.

It should be noted that each transmission comprises a fixed number of transmitted bits (and thus a same number of frames). This number (for example, 8 or 16 bits) preferably corresponds to the depth (number of bits) of a register used in receive mode as will be better understood in relation with the following FIG. 5.

Duration $t_{bit}$ of each slot of the frame depends on the desired transmission speed, for example selected according to the capacity of the circuit detectors. This time must at least enable the receiver circuit to interpret the frame.

Figure 4:
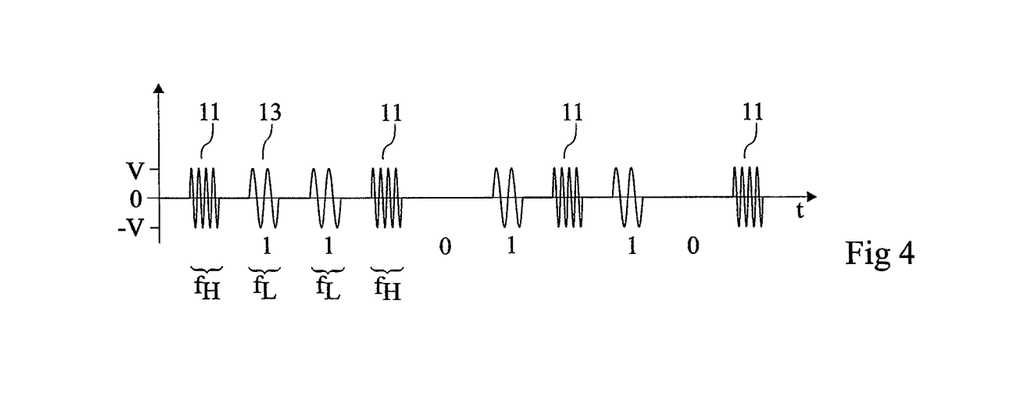
FIG. 4 is a timing diagram of another embodiment of the present invention.

FIG. 4 is a timing diagram illustrating another embodiment in which the high states of the synchronization slot and of the data bits are respectively coded by A.C. signals at two different frequencies. For example, the synchronization slot is coded by a group of halfwaves (for example, a sinusoidal train) or a train of pulses at a first frequency ($f_H$) while a high state of slots 13 or 15 is coded by a group of halfwaves or a train of pulses at a second frequency ($f_L$), for example, lower than the first one. The low states of slots 12, 14, and 16 as well as the bits of value 0 transmitted in slots 13 and 14 are coded by the absence of any signal and the forcing of the bus to the reference voltage (the ground). In this embodiment, the A.C. signals are preferably centered on the reference voltage (between voltages −V and V). FIG. 4 illustrates the transmission of three transmit bits (slots TX) having states 1, 0, and 1, and of three receive bits (slots RX) having states 1, 1, and 0.

Figure 5:
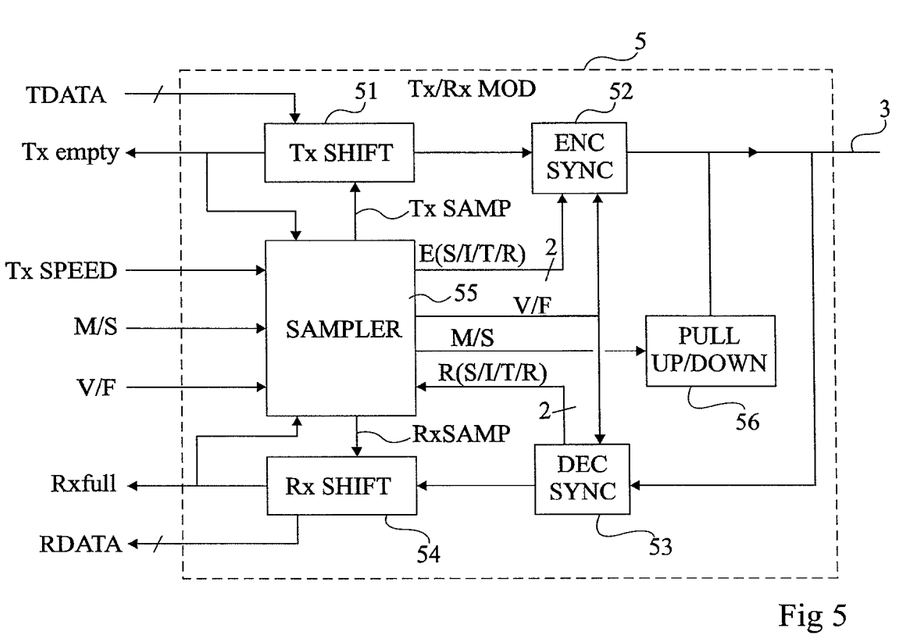
FIG. 5 is a simplified block diagram of a communication unit according to an embodiment of the present invention.

FIG. 5 is a simplified block diagram of a transceiver unit 5 capable of equipping the different system circuits (see FIG. 1). Data TDATA to be transmitted are provided to unit 5, for example, in parallel by words (for example, of 8 or 16 bits) over an output bus of the processing unit (not shown in FIG. 5). For the needs of the transmission, the data must be serialized. To achieve this, unit 5 comprises a transmit serializing circuit 51 (Tx SHIFT), for example, a shift register, preferably of first-in-first-out type (FIFO). Register 51 receives in parallel data TDATA to be transmitted and provides these data bit by bit to an encoder 52 (ENC SYNC) in charge of generating frames 10. The output of encoder 52 is connected to single-wire bus 3. On the receive side, bus 3 is connected to the input of a decoding circuit 53 (DEC SYNC) in charge of decoding the received frames. The output of decoder 53 is sent to the input of a circuit 54 for parallelizing (Rx SHIFT) the received flow into words RDATA over several bits (for example, 8 or 16). The operation of unit 5 is controlled by a circuit 55 (SAMPLER) which receives, for example, from the processing unit, a signal Tx SPEED indicative of the desired transmission speed. This signal may correspond to a clock signal or, assuming that unit 5 further receives a clock signal, to a speed selection signal. Circuit 55 also receives a signal M/S indicative of the master or slave mode of the circuit containing unit 5. It further receives data relative to the transmitted and receive words from registers 51 and 54. More specifically, register 51 provides data Txempty indicating that it is empty, that is, that the byte which has been loaded therein has been transmitted (at least sent to encoder 52). Similarly, register 54 provides a signal Rxfull indicating that it contains a full data word. Indicative signals Txempty and Rxfull are also sent to circuit 55 to cause the sending of a new data word or notify that a received word has been delivered.

Circuits 52 and 53 also ensure the functions of modulation and demodulation of the coded frames.

Finally, unit 5 comprises a circuit 56 (PULL UP/DOWN) for managing functions pulling up the bus or pulling it down. This circuit is used in the idle state to impose a low state on the bus, and to then detect that a circuit has pulled up the bus, which enables the current circuit to set to a slave mode.

If unit 5 is capable of operating both in voltage mode (FIG. 3) and in frequency mode (FIG. 4), it receives a configuration bit V/F transferred by circuit 55 to encoders 52 and decoders 53 to place them in the adapted configuration.

Circuit 55 provides encoder 52 with data relative to the bit of the frame to be transmitted. These data are, for example, transmitted over a control bus E(S/I/T/R) in the form of a signal S/I/T/R indicating to the encoder the nature of the current slot of the frame from among the synchronization slot, an idle slot, the transmit slot, or the receive slot.

Similarly, decoder 53 provides circuit 55 with data as to the nature of the current slot that it receives in the form of a signal S/I/T/R over a bus R(S/I/T/R).

Finally, circuit 55 provides registers 51 and 52 with control signals TxSAMP and RxSAMP to synchronize their operation with that of encoder 52 and decoder 53.

Signals Txempty, M/S, V/S, Rxfull, TxSAMP, and RxSAMP are, for example, binary signals having their state representing the data conveyed by the signal. Signals S/I/T/R are for example signals over two bits respectively decoded by encoder 52 and sampler 55. Other control modes are possible, provided to respect the described functionalities. Further, other control and configuration signals may transit between the different elements of the unit (for example, power supply, clock signals, etc.).

Figure 6:
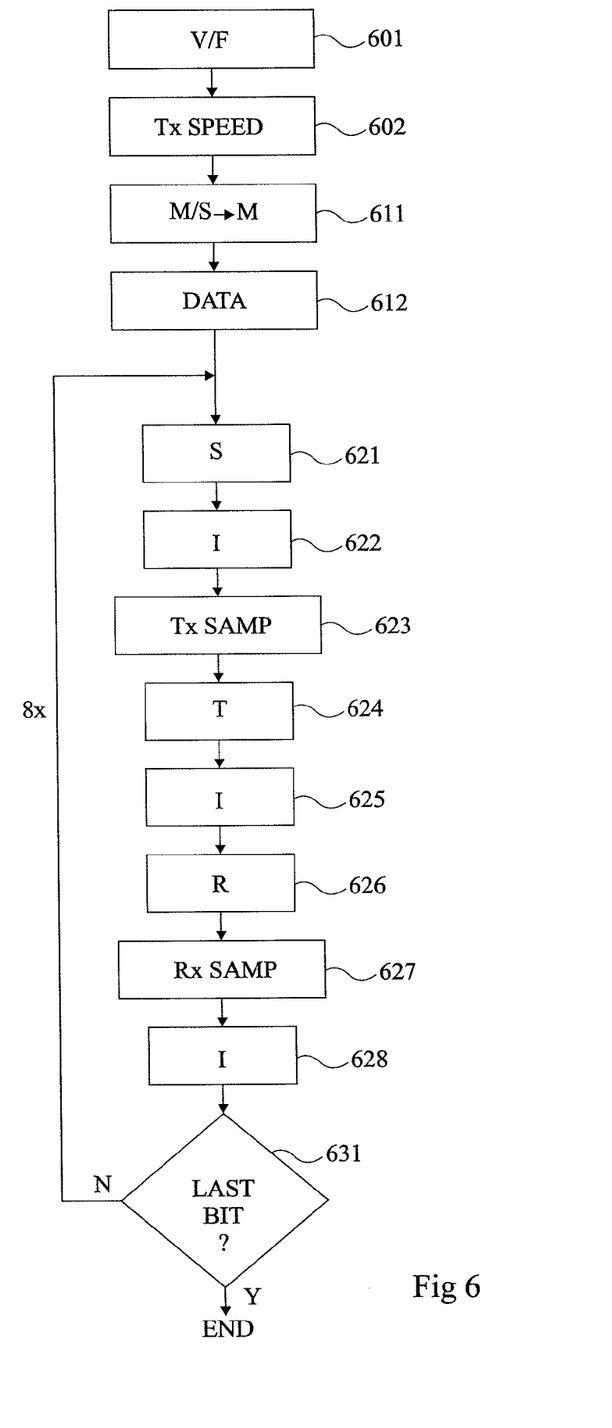
FIG. 6 is a simplified timing diagram illustrating an example of operation of the communication protocol on the master circuit side.

FIG. 6 is a simplified flowchart of an example of transmission of a data byte from a master circuit to a slave circuit. A first step (block 601, V/F) to comprises selecting the voltage or frequency mode of the transmission. This selection is optional. In a simplified embodiment, the system only operates in voltage mode or in frequency mode and the different circuits are then set for this operating mode.

In a second step (block 602, Tx SPEED), the central processing unit communicates the desired communication speed. Here again, in a simplified embodiment, the transmission speed is predefined. It should, however, be noted that the transmission speed may be modified at any time (from one bit to the other) since a synchronization slot is present at each bit.

A third step (block 611, MS->M) comprises indicating to unit 5 an operation in master mode. Then (block 612, DATA), a data byte is loaded into register 51.

Circuit 55 then synchronizes the operation of unit 5 for the eight data bits to be transmitted. Circuit 55 is informed of the presence of the byte in register 51 by a state switching of signal Txempty. Circuit 55 sets (block 621, S) bus E(S/I/T/R) to a state giving circuit 52 the indication to transmit a synchronization slot. Then (block 622, I), it switches to the state indicating the sending of an idle slot. Circuit 55 then causes a state switching of signal TxSAMP (block 623) directed towards register 51 so that said register presents the first bit to be transmitted to encoder 52. Then (block 624, T) it switches bus E(S/I/T/R) (block 624) to value T to cause the transmission of the data bit. Circuit 55 then switches (block 625, I) bus E(S/I/T/R) to a second idle slot I, then to state R (block 626) to place encoder 52 in the idle state during the reception of the bit by decoder 53. When decoder 53 has decoded slot 15 of the frame, it notifies circuit 55 by a switching of bus R(S/I/T/R) that it has received a slot 15. Circuit 55 then switches signals Rx SAMP (block 627) to notify register 54 that the bit provided by decoder 53 should be loaded. Finally, circuit 55 switches bus E(S/I/T/R) to the end slot or an idle slot (block 628, I).

Steps 621 and 628 are carried out as long as the last data bit (block 631, LAST BIT) has not been transmitted. Once it has been transmitted, the byte transmission loop is left (output Y of block 631).

Figure 7:
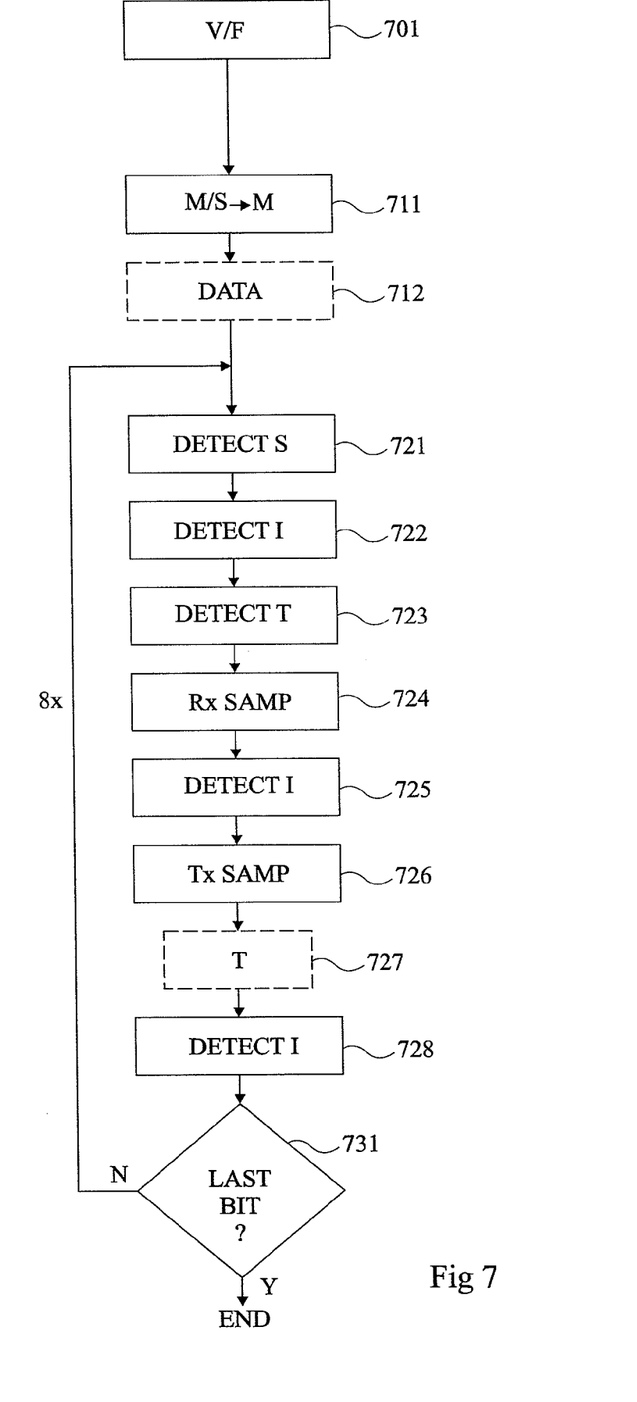
FIG. 7 is a simplified timing diagram illustrating an example of operation of the communication protocol on the slave circuit side.

FIG. 7 is a simplified timing diagram of an example of operation of a receiver (unit 5 operating in slave mode).

Regarding the master unit, it is started (block 701) by selecting the operating mode between voltage and frequency.

Unit 5 is switched to the slave mode (block 711, M/S->S) by circuit 55 which has detected that another circuit has taken control of the bus.

In the case of a bidirectional communication, the receive unit prepares data to be sent (block 712 in dotted lines, DATA).

After this, a byte receive loop starts. As soon as unit 5 has set to a slave mode, it expects the next edge to be the beginning of a synchronization slot, the measurement of the duration of the synchronization slot enabling circuit 55 to synchronize the detection of the sendings that it will perform as a response. The first step thus is (block 721, DETECT S) the detection of a slot S. When it is detected, circuit 53 switches bus R(S/I/T/R) to notify circuit 55 of the reception of the synchronization slot. The next step (block 722, DETECT I) is the detection of an idle slot. Circuit 53 places bus R(S/I/T/R) to notify circuit 55 of the reception of slot 12. Then, it configures detector 53 for the decoding of slot 13 (reading of a level 0 or of a level 1). As soon as the data bit is decoded (block 723, DETECT T), detector 53 set bus R(S/I/T/R) to the corresponding state. Sampler 55 then switches (block 724) signal Rx SAMP to indicate to register 54 to take into account the state present at the output of detector 53. Then (block 725, DETECT I), decoder 53 detects an idle slot.

If data must be sent from the receiver to the transmitter, circuit 55 detects this by the state of signal Txempty which notifies it that bits to be transmitted are present in register 51. Circuit 55 then switches (block 726 in dotted lines) signal TxSAMP for the bit sending and switches (block 727 C in dotted lines) bus E(S/I/T/R) so that encoder 52 transmits the bit over bus 3.

It is not disturbing for decoder 53 to carry on the detection during slot 15. Indeed, since all slots have the same duration, detector 53 does not take slot 15 into account.

Detector 53 then detects the end slot (block 728).

Steps 721 and 728 are repeated as long as the byte is not finished (block 731, LAST BIT).

It can be seen that a synchronizations slot is sent on each exchange of a data bit. This enables resynchronizing the shift registers of the transmit and receive units.

Preferably, the circuit having initiated the transmission continues until it receives an acknowledgement of receipt for a full byte. As a variation, the transmission only proceeds from one data bit to the next data bit from the time when the receiver has acknowledged that it has received the previous bit.

It should be noted that the master and slave status of the different circuits may be configured during the communication. However, in a simplified embodiment, dedicated circuits may be used. In this case, the pull-up resistance of bus 3 may be omitted.

Various embodiments with different variations have been described hereabove. It should be noted that those skilled in the art may combine various elements of these various embodiments and variations without showing any inventive step. Further, the practical implementation of embodiments of the present invention and in particular of transceiver unit 5 based on the functional indications given hereabove is within the abilities of those skilled in the art, using usual electronic components. Further, although the present invention has been described in relation with a specific voltage and frequency mode, other coding modes of the high and low states may be envisaged. For example, a different phase may be provided according to state 0 or 1 with a signal at constant frequency. Finally, the sequencings provided as an example in the timing diagrams of FIGS. 6 and 7 may be modified according to the application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of communication over a bus between a transmitter device and at least one receiver device, the bus comprising not more than one wire, the method comprising:
    transmitting a communication over the bus, the communication comprising a plurality of related data bits, wherein transmitting the plurality of related data bits comprises transmitting a plurality of frames, wherein each data bit of the plurality of related data bits corresponds to a different frame of the plurality of frames and each frame of the plurality of frames comprises a corresponding data bit, wherein each of the plurality of frames successively comprises:
        a synchronization slot, the synchronization slot having a state different from reference states of the communication between the transmitter device and the at least one receiver device;
        a first idle slot in a state corresponding to a first reference state of the communication;
        a slot in a state representing the data bit corresponding to the frame;
        a second idle slot having a state identical to the state of the first idle slot;
        a slot to contain a state of an optional response bit; and
        an end slot having a state identical to the state of the first idle slot and the second idle slot.

2. The method of claim 1, wherein durations of all the slots of the frame are identical.

3. The method of claim 1, wherein:
    a first reference state of the communication is a high-level state;
    transmitting a high-level data bit in the frame comprises setting the slot in a state corresponding to the data bit to the high-level state; and
    transmitting the synchronization slot of the frame comprises setting the synchronization slot to a state different from the high-level state.

4. The method of claim 1, wherein:
    a first reference state of the communication is a low-level state;
    transmitting a low-level data bit comprises setting the slot in a state corresponding to the data bit to the low-level state; and
    transmitting the first idle slot comprises setting the first idle slot to the low-level state.

5. The method of claim 1, wherein, to transmit data from the receiver to the transmitter, the receiver codes the slot intended for the response bit.

6. The method of claim 1, further comprising:
    at a time that no frame is to be transmitted over the bus, setting the bus to an idle state, wherein setting the bus to the idle state comprises setting the bus to a reference state of the communication.

7. The method of claim 1, wherein transmitting the plurality of data bits over the bus comprises transmitting the plurality of related data bits over a bus comprising not more than one wire.

8. The method of claim 1, further comprising:
    transmitting a plurality of second communications over the bus, wherein each of the plurality of second communications comprising a second plurality of related bits and wherein transmitting each second data bit of the second plurality of related bits for a second communication comprises transmitted a frame comprising the synchronization slot, the first idle slot, the slot in a state representing the second data bit, the second idle slot, the slot to contain the state of the optional response bit, and the end slot,
    wherein each of the communication and the plurality of second communications includes a same number of bits.

9. The method of claim 8, wherein the same number of bits is a number corresponding to a number of bits that can be stored by a register of the transmitter device.

10. The method of claim 8, wherein the same number of bits is a number corresponding to a number of bits of a word of the transmitter device.

11. A transceiver unit for communication with at least one device via a bus, the bus comprising not more than one wire, the transceiver unit comprising:
    a control unit;
    a serialization element for serializing data to be transmitted;
    a parallelization element for parallelizing received data;
    an encoder of data to be transmitted, receiving an output of the serialization element and having an output connected to the bus, wherein the encoder is configured to generate a frame individually corresponding to each individual data bit of the data to be transmitted, the frame successively comprising a plurality of slots comprising a plurality of signals having different frequencies of oscillation, the plurality of slots comprising:

a synchronization slot, the synchronization slot having a first signal having a first frequency,
a first idle slot having a second signal having a second frequency,
a slot having a third signal representing the data bit to be transmitted, the third signal having the second frequency when the data bit is of a first value and having a third frequency when the data bit is of a second value,
a second idle slot having the second signal having the second frequency,
a slot having a fourth signal representing a state of an optional response bit, the fourth signal having the second frequency when the optional response bit is of the first value and having the third frequency when the optional response bit is of the second value, and
an end slot having the second signal having the second frequency; and
a decoder having an input connected to the bus and having an output connected to an input of the parallelization element, wherein:
the data to be transmitted is a communication comprising a plurality of related data bits; and
the encoder is configured to generate a frame individually corresponding to each individual data bit of the plurality of related data bits of the communication.

12. The unit of claim 11, comprising an input for configuring a transmission speed.

13. The unit of claim 11, comprising an input for configuring a master or slave status of the transceiver unit.

14. The unit of claim 11, comprising an input for configuring a mode in which transmissions are coded and decoded from among several modes.

15. The transceiver unit of claim 11, wherein the transceiver unit receives as input the communication comprising the plurality of related data bits.

16. A method of communicating over a bus, the bus comprising not more than one wire, the method comprising:
transmitting or receiving a plurality of frames over the bus, each frame of the plurality of frames comprising a single bit of a plurality of related bits of a communication to be exchanged over the bus, each frame comprising:
a synchronization slot;
a first idle slot;
a data transmission slot comprising the single bit;
a second idle slot;
a data reception slot; and
an end slot.

17. The method of claim 16, wherein the synchronization slot, first idle slot, data transmission slot, second idle slot, data reception slot and end slot each has the same duration.

18. The method of claim 16, further comprising:
transmitting a plurality of second communications over the bus, wherein each of the plurality of second communications comprising a second plurality of related bits and wherein transmitting each second data bit of the second plurality of related bits for a second communication comprises transmitted a frame comprising the synchronization slot, the first idle slot, the data transmission slot, the second idle slot, the data reception slot, and the end slot,
wherein each of the communication and the plurality of second communications includes a same number of bits.

19. The method of claim 18, wherein the same number of bits is a number corresponding to a number of bits that can be stored by a register of a device performing the transmitting or receiving.

20. The method of claim 18, wherein the same number of bits is a number corresponding to a number of bits of a word of a device performing the transmitting or receiving.

21. A transceiver unit for communication with at least one device via a bus, the bus comprising not more than one wire, the transceiver unit comprising:
a control unit;
a serialization element for serializing data to be transmitted;
a parallelization element for parallelizing received data;
an encoder of data to be transmitted, receiving an output of the serialization element and having an output connected to the bus wherein the encoder is configured to generate a frame individually corresponding to each individual data bit of the data to be transmitted, the frame successively comprising a plurality of slots comprising a plurality of signals having different frequencies of oscillation, the plurality of slots comprising:
a synchronization slot, the synchronization slot having a first signal having a first frequency,
a first idle slot having a second signal having a second frequency,
a slot having a third signal representing the data bit to be transmitted, the third signal having the second frequency when the data bit is of a first value and having a third frequency when the data bit is of a second value,
a second idle slot having the second signal having the second frequency,
a slot having a fourth signal representing a state of an optional response bit, the fourth signal having the second frequency when the optional response bit is of the first value and having the third frequency when the optional response bit is of the second value, and
an end slot having the second signal having the second frequency; and
a decoder having an input connected to the bus and having an output connected to an input of the parallelization element,
wherein one of the first frequency, the second frequency, or the third frequency is zero.

22. The transceiver unit of claim 21, wherein the transceiver unit is configured to receive an input for configuring a transmission speed.

23. The transceiver unit of claim 21, wherein the transceiver unit is configured to receive an input for configuring a master or slave status of the transceiver unit.

24. The transceiver unit of claim 21, wherein the transceiver unit is configured to receive an input for configuring a mode in which transmissions are coded and decoded from among several modes.

* * * * *

UNITED STATES PATENT AND TRADEMARK OFFICE
CERTIFICATE OF CORRECTION

PATENT NO. : 8,683,101 B2  Page 1 of 1
APPLICATION NO. : 12/840652
DATED : March 25, 2014
INVENTOR(S) : Didier Ingels It is certified that error appears in the above-identified patent and that said Letters Patent is hereby corrected as shown below:

On the title page, item [54], and in the specification, column 1, line 1, should read:

SINGLE-WIRE BUS COMMUNICATION PROTOCOL

Signed and Sealed this
Third Day of June, 2014

Michelle K. Lee
*Deputy Director of the United States Patent and Trademark Office*